United States Patent [19]
Czuprynski

[11] Patent Number: 5,214,472
[45] Date of Patent: May 25, 1993

[54] METAL BELT DRIVE FOR RECORDING ELEMENT IN A COPIER/PRINTER

[75] Inventor: Daniel M. Czuprynski, Fairport, N.Y.

[73] Assignee: Eastman Kodak Company, Rochester, N.Y.

[21] Appl. No.: 817,030

[22] Filed: Jan. 3, 1992

[51] Int. Cl.⁵ .............................................. G03G 13/00
[52] U.S. Cl. ................... 355/210; 355/233; 474/272
[58] Field of Search ............... 474/270, 272; 355/200, 355/210, 211, 233, 234, 235

[56] References Cited

U.S. PATENT DOCUMENTS

| 2,674,366 | 4/1954 | Kindseth et al. |
| 3,208,297 | 9/1965 | Woods et al. ........................ 474/272 |
| 3,736,056 | 5/1973 | Burnet ................................. 355/235 |
| 3,957,367 | 5/1976 | Goel. |
| 4,402,593 | 9/1983 | Bernard et al. |
| 4,935,778 | 6/1990 | Mochida ............................. 355/211 |

FOREIGN PATENT DOCUMENTS 2-159445 6/1990 Japan.

Primary Examiner—R. L. Moses
Attorney, Agent, or Firm—David A. Howley

[57] ABSTRACT

Apparatus for driving a recording element in a copier/printer, comprises a motor and a speed-reducing, metal belt drive system operatively connecting the motor's drive shaft and an axle used to advance the recording element. The metal belt(s) of such speed-reducing system are preferably made of a material selected from the group consisting of nickel, beryllium-copper and stainless steel. The metal belts provide a precision drive which is immune to the backlash and flutter problems associated with gear trains and the like. Also, owing to the torsional stiffness of such belts, belt creep around the belt-supporting pulleys of such system is negligible, and any deflection of the recording element as a result of extraneous "torque spikes" on the recording element is minimal.

2 Claims, 5 Drawing Sheets

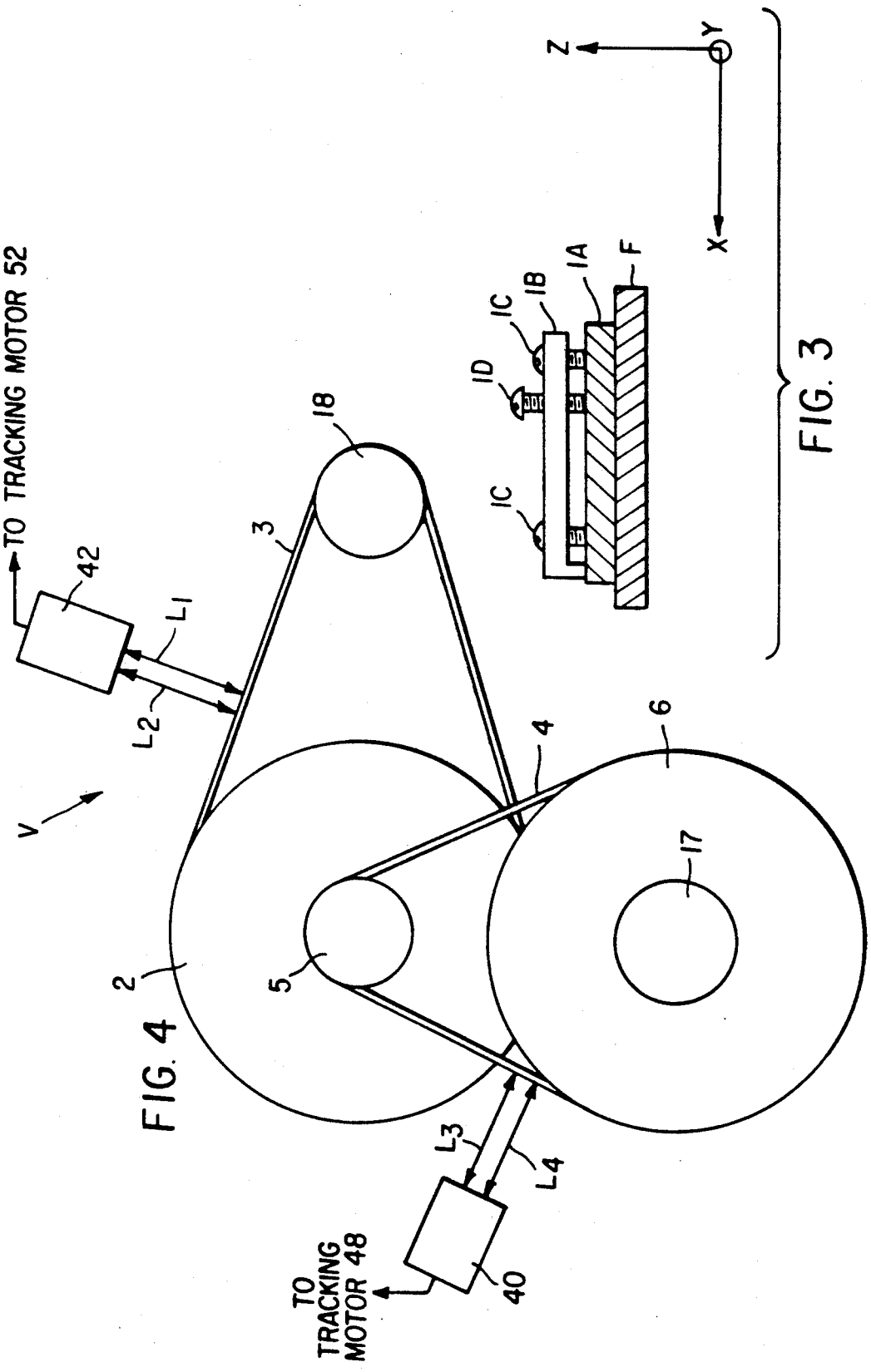

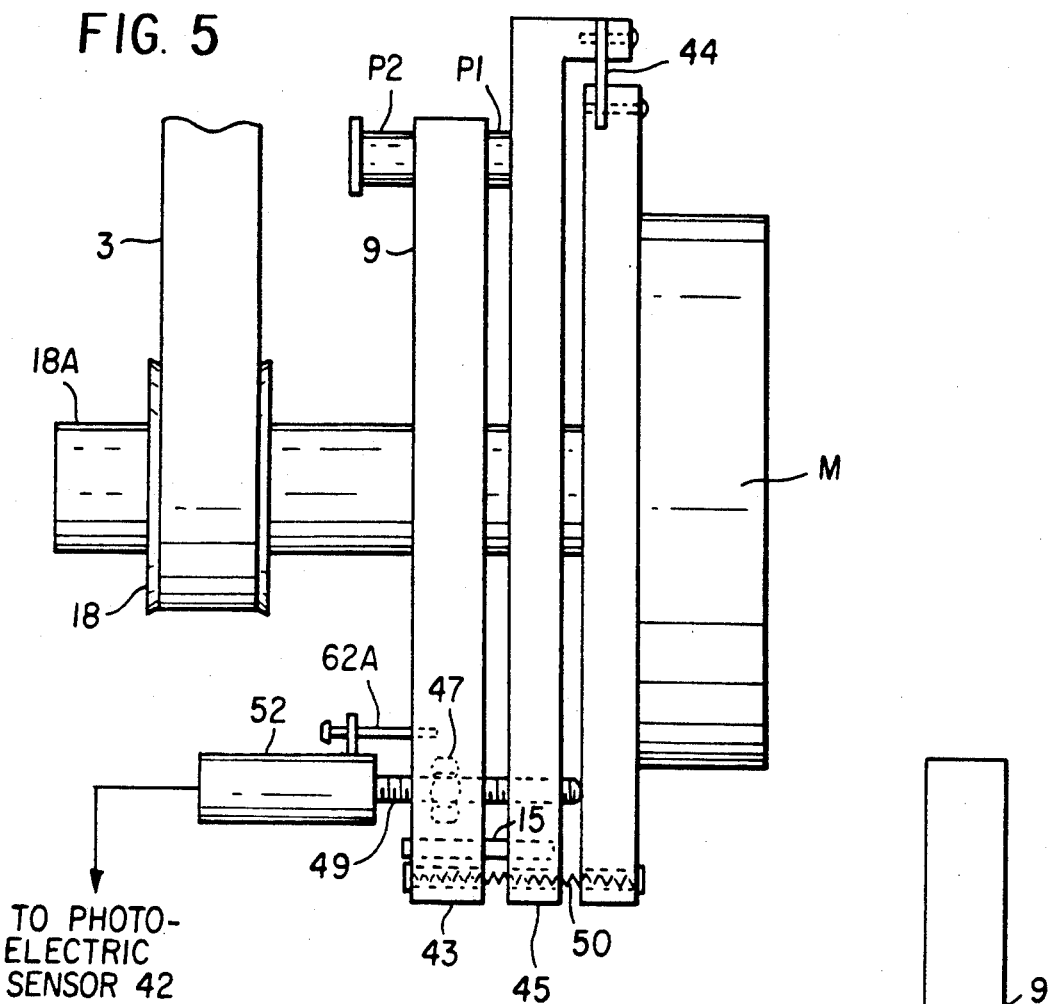
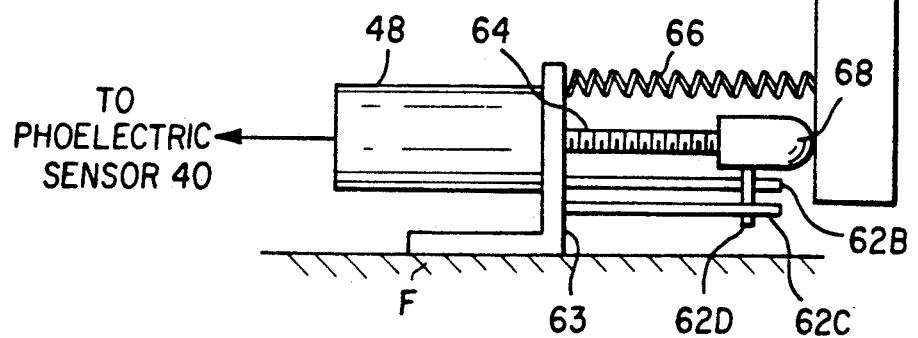

METAL BELT DRIVE FOR RECORDING ELEMENT IN A COPIER/PRINTER

TECHNICAL FIELD OF THE INVENTION

The present invention relates to printers of the type in which pictoral information is recorded, pixel-by-pixel, by scanning a moving recording element with an intensity modulated beam of radiation, or with an array of LED's or thermal emitters. The invention may be used in silver halide (conventional photography) or electrophotographic systems.

BACKGROUND ART

In printer systems wherein an intensity-modulated beam of radiation (e.g., a laser beam) repeatedly scans a moving recording element to record image information, pixel-by-pixel, the velocity at which the recording element moves must be extremely uniform to produce high quality images. This also applies where the image information is being applied to a moving recording element line-by-line, such as with a linear array of light emitting diodes. If the velocity at which the recording element moves varies while the rate at which the image information is conveyed remains the same, there will be either a crowding together or spreading apart of lines of image information. This artifact, known as banding, causes a degradation in image quality.

In commonly assigned U.S. application Ser. No. 07/688,004, filed on Apr. 19, 1991 in the name of Kevin M. Johnson, entitled POSITION CONTROL APPARATUS FOR TRANSFER DRUM IN ELECTROSTATOGRAPHIC PRINTER/COPIER, there is disclosed an electrophotographic apparatus in which a scanning laser beam imagewise discharges an electrostatic charge on the surface of a photoconductive drum, leaving an electrostatic latent image. The electrostatic latent image is developed with colored toner particles from one of several development stations to create a transferable color toner image on the outer surface of the photoconductive drum. The toner image is transferred to a receiver sheet at a nip formed between the photoconductive drum and a transfer drum. The transfer drum is internally heated and its outer surface is urged into contact with the photoconductive drum surface at a relatively high force (e.g., 300–500 pounds). When the leading edge of the receiver sheet enters the nip, it suddenly retards the rotation of the photoconductive drum, causing a sudden increase in the torque (force) required to rotate the drum at constant speed. Similarly, when the trailing edge of the receiver sheet leaves the nip, the drum torque is suddenly decreased, causing a temporary increase in drum speed. If the laser is recording image information at the time of these "torque spikes", variations in line spacing will occur, causing the above-described banding artifact to appear. Of course, this artifact also appears as a result of any variation in velocity (sometimes known as "flutter") of the recording element.

The above-mentioned velocity fluctuations have a particularly adverse impact on the quality of prints produced by multicolor printer systems. In the Johnson apparatus, several color separation toner images are superimposed on each other on the receiver sheet to form a multicolor image. If the lines of image information are not uniformly spaced apart for each color separation image, color misregistration will result in the composite image.

Heretofore, various approaches have been proposed and used for uniformly driving the recording element in a printing system. They include direct drive systems in which, e.g., a motor shaft is directly coupled to the axle of a photoconductive drum, and indirect drive systems in which various means are provided for effecting a reduction in speed between the motor shaft and the driven element. Such speed-reducing means include compliant belts, chains and various types of gear trains. A speed reduction between the motor shaft and the recording element is employed to: (1) reduce the torque required of the motor; (2) reduce the current required; (3) run the motor in a more efficient state; and (4) allow for more uniform control of the motor, as motor speed uniformity is easier to obtain when the motor is running faster.

One approach to minimizing the effect of motor speed variations is to attach a large flywheel to the drive shaft of the motor used to advance the recording element or to the recording element itself. This has the effect of increasing the kinetic energy stored in the system when in operation. When the system experiences negative torque, the flywheel gives up some of its kinetic energy to assist in maintaining a constant motor speed. When a positive torque is induced on the motor, the large moment of inertia of the flywheel retards an increase in velocity of the motor. Such a system is shown in U.S. Pat. No. 4,935,778 to Mochida, issued on Jun. 19, 1990. This method works well for systems where disturbances, such as torque spikes, are minimal, but would do little to eliminate the flutter induced by large torque spikes. The increased inertia serves to lower the natural frequency of the system, which is undesirable because it makes servo-control of the driven element difficult.

A problem with traditional methods of speed reduction is that they introduce velocity errors into the system due to geometric inaccuracies, such as tooth-to-tooth errors in a gear-drive system and run-out of rotating elements in a compliant belt system. Further problems with some of these approaches are that they introduce compliance into the system, which is undesirable because: (1) a driven element will change velocity under the influence of a disturbance, such as a torque spike imposed upon a photoconductor drum; (2) after the disturbance is removed, the velocity will oscillate, with the magnitude of the oscillation being directly proportional to the compliance; and (3) the resonant frequency of the system is reduced when compliance is introduced, which makes servo-control of the driven element difficult. One other problem encountered in some reduction schemes is that backlash is introduced into the system, which makes servo-control of the driven element difficult or impossible.

SUMMARY OF THE INVENTION

In view of the foregoing discussion, an object of this invention is to minimize the "banding" artifact in laser printers, as well as in printers wherein image information is recorded line-by-line (such as with an array of LED's).

It is another object of the present invention to provide an apparatus for driving a recording element in a copier/printer at an extremely uniform velocity, thus enhancing the quality of color copies.

According to the invention, the recording element of a laser or LED printer is driven by a constant speed motor via a speed-reducing, metal belt drive system. The belt(s) of such speed-reducing system are made from any metal with a high Young's modulus, such as nickle, berylium-copper or stainless steel. Being non-elastic, these metal belts provide a precision drive which is immune to the backlash and flutter problems of the aforementioned prior art drive systems. In a preferred embodiment of the invention, an active tracking system is used to keep the metal belts properly aligned on pulleys.

The torsional stiffness of the metal belts used in this application is extremely high (e.g., 193,000 inch-lbs./radian for each belt). This results in small deflections due to torque spikes and a high system natural frequency, which allows the servo-bandwidth to be as high as possible. Due to the belt stiffness, belt creep around the pulleys is negligible. This yields high fidelity transmission regardless of torque loading on the drive.

Other objects and advantages of the invention will be better understood from the ensuing detailed description of a preferred embodiment, reference being made to the accompanying drawings.

BRIEF DESCRIPTION OF THE DRAWINGS

FIG. 3 is an end view of plates used to mount the apparatus of FIG. 2;

FIG. 4 is a side view of an active belt-tracking apparatus;

FIG. 5 is an end view of a belt steering portion of the active belt-tracking apparatus;

FIG. 6 is an end view illustrating another component of the belt steering portion of the apparatus shown in FIG. 3.

BEST MODE FOR CARRYING OUT THE INVENTION

Although the invention is being described hereinbelow with particular reference to an electrophotographic recording system in which a laser scanner is used to imagewise expose a photoconductive recording element, it will be apparent to those skilled in the art that the invention has utility in any high quality imaging system in which images are produced on a pixel-by-pixel or a line-by-line basis (such as with an array of LED's or thermal emitters) on a moving recording element.

Figure 1:
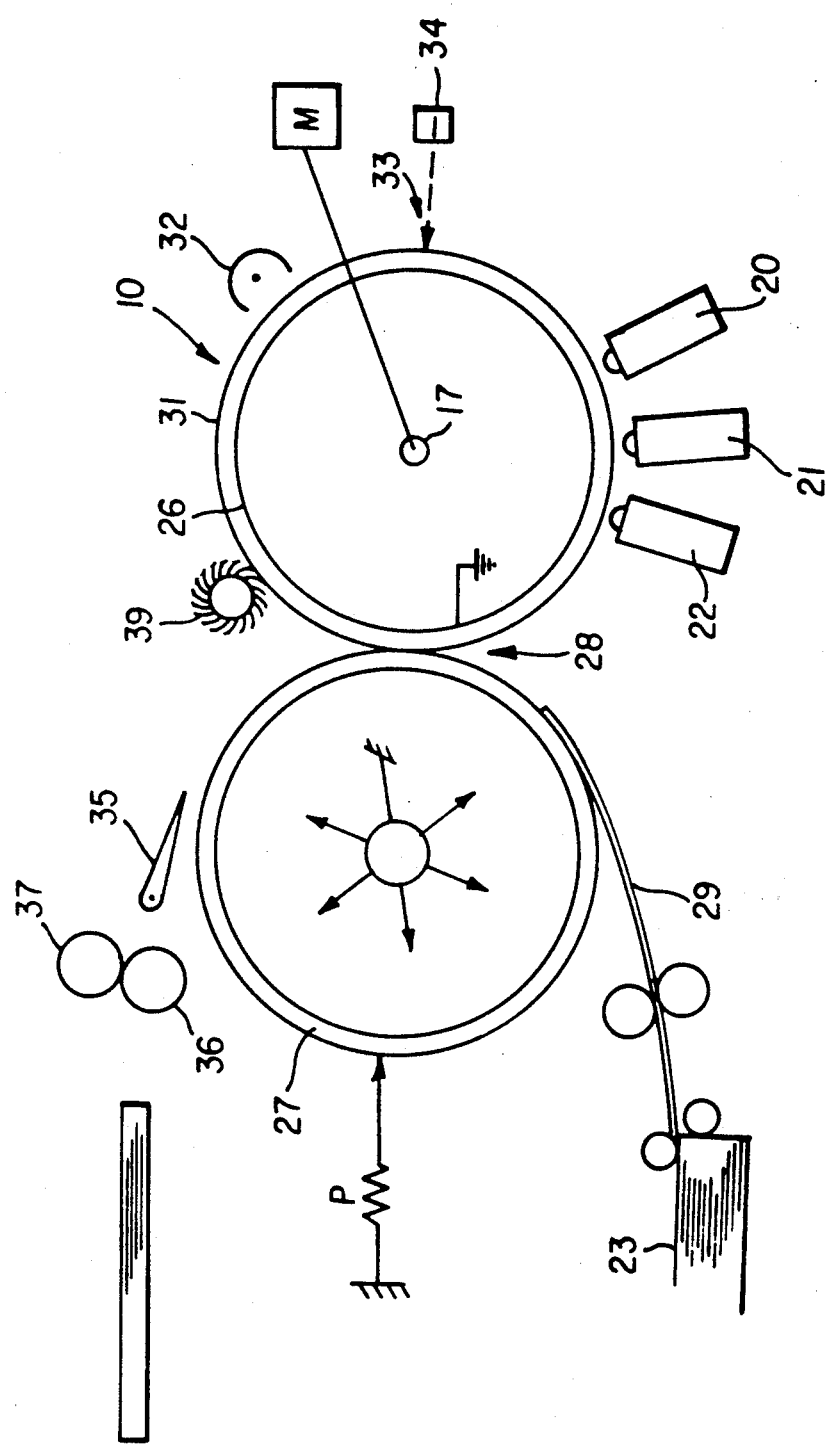
FIG. 1 is a schematic illustration of an electrophotographic color printer in which the invention has utility.

Turning now to FIG. 1, a multicolor electrophotographic recording apparatus is disclosed in which transferable toner images of different color are formed on a photoconductive drum 10. Drum 10 comprises an electrically conductive cylinder 26 having a photoconductive outer layer 31. The photoconducive drum is rotatably supported by a frame (not shown) and is driven at a uniform velocity by a motor M which is coupled by a novel metal belt drive system (described below) to an axle 17 of cylinder 26. The recording apparatus includes a charger 32 for depositing a uniform electric charge on photoconductive layer 31. Layer 31 is then imagewise exposed according to color separation image data by a laser beam scanning apparatus comprising a laser beam source 34 which produces an intensity-modulated laser beam 33. A rotating polygon or the like (not shown) serves to repeatedly scan the beam in a direction normal to the plane of the drawing, thereby producing a series of horizontal scan lines, while the vertical or cross-scanning of the beam is achieved by rotation of the drum, thus generating a two-dimensional raster scan. This scanning selectively discharges the photoconductive layer, leaving behind a latent electrostatic image.

Next, the latent electrostatic image on photoconductive layer 31 is developed by one of the three developer stations 20, 21 or 22. (In a monochrome system there would be only one developer station.) As is well known in the art, toner particles of a charge opposite that of the electrostatic latent image are brought into proximity with the outer layer 31. The toner particles adhere to the outer layer in a pattern corresponding to the electrostatic latent image.

An image-receiver sheet 29, such as a sheet of paper having a thermoplastic coating, is then fed onto a transfer drum 27 which is rotatably driven by the photoconductive drum. The developed image on the photoconductive drum is transferred to receiver sheet 29 at a transfer zone 28 defined by the nip between the two drums. The transfer drum is internally heated by a heating element E, and pressure-applying means P are provided for urging the transfer drum into engagement with the photoconductive drum. Thus, transfer of the toner image from the photoconductive drum to the receiver sheet is effected by a combination of heat and pressure. If the final copy is to be a multicolor copy, receiver sheet 29 remains on transfer drum 27 for several revolutions, and the foregoing image-forming process is repeated. During each subsequent process, however, the image information imparted by light beam 33 will correspond to a different color separation image than during the previous passes. A different development station 20, 21 or 22 containing a different colored toner will be used to develop a second color separation image that will be superimposed on the first color separation image on receiver sheet 29. The process continues until all colors have been superimposed onto receiver sheet 29.

After the receiver sheet has received the entire image from the photoconductive drum, a pick-off blade 35 removes the receiver sheet from the surface of transfer drum 27. Receiver sheet 29 then passes through a nip formed by a fusing roller 37 and a backing roller 36. Fusing roller 37 is maintained at an elevated temperature and permanently fuses the toned image to the receiver sheet 29. Cleaning brush 39 cleans the photoconductive drum of any residual toner particles after each image is transferred to receiver sheet 29.

Now, in accordance with the present invention, there is provided a novel and technically advantageous mechanism for coupling drive motor M with the photoconducive drum axle 17. A preferred embodiment of this mechanism is shown in FIG. 2 in which a pair of metal belts 3 and 4 cooperate with a double pulley 14 and a pulley 6 to provide a speed reduction between a pulley 18 mounted on a drive shaft (not shown) of motor M and axle 17.

Figure 2:
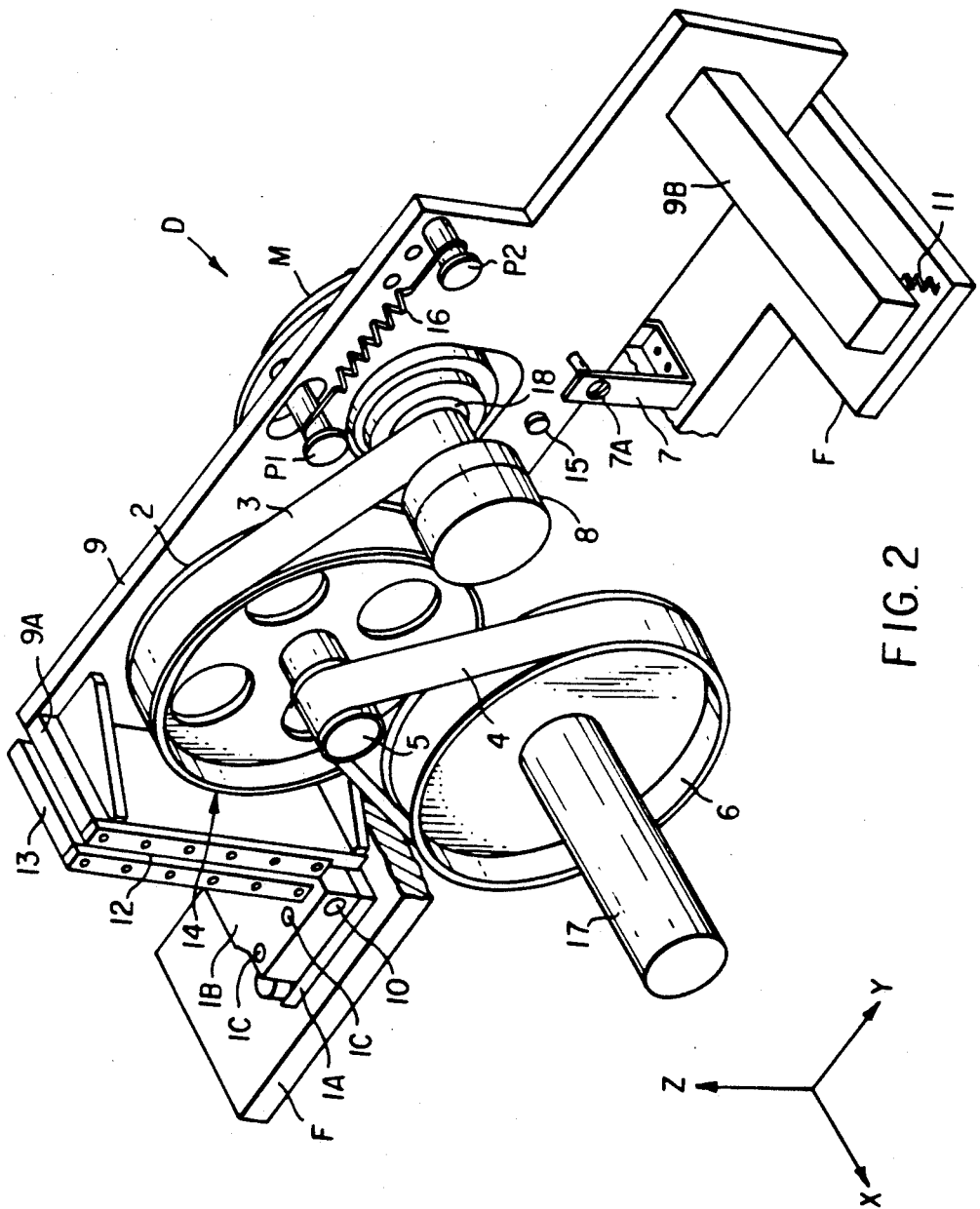
FIG. 2 is a diagrammatic perspective view of a metal belt drive apparatus adapted for use with the FIG. 1 printer.
Figure 7:
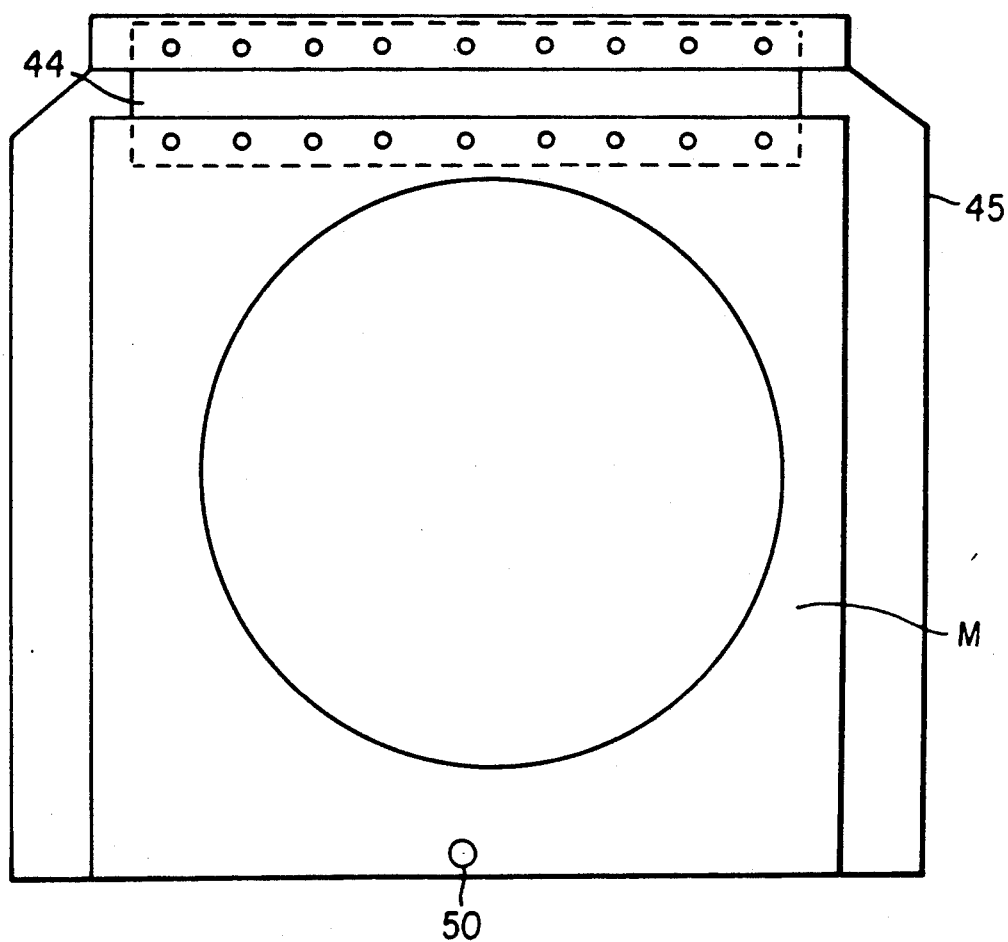
FIG. 7 is a side view of the FIG. 4 apparatus.

Discussing FIG. 2 in more detail, motor M, which may comprise, for example, a DC servo-motor, operates to rotate pulley 18 via the driveshaft. The motor M is pivotably mounted to a mounting plate 9 on a pivot pin 15 such that motor M can rotate about the pin axis. An encoder 8, coupled to the motor drive shaft, provides feedback to control motor speed. Double pulley 14 is rotatably mounted onto a shaft (not shown) which is gimbally mounted on mounting plate 9 such that the shaft may be adjusted about two axes which are perpendicular to the shaft and which are perpendicular to each other. This gimballed shaft allows for proper belt tracking of metal belt 3.

Large pulley 2 of the double pulley and pulley 18 are connected by a metal belt 3. Spring 16, in tension, attaches pin P1, which is attached to the motor, and pin P2 which is attached to the mounting plate. The spring biases motor 7 and, thus, pulley 18 away from large pulley 2, providing tension in metal belt 3. The line of action of spring 16 is in the same Z-Y plane as the center of belt 4 when belt 4 is centered on pulleys 2 and 18. This eliminates unwanted twisting forces.

A small pulley 5 of double pulley 14, which is rigidly connected to and concentric with large pulley 2, is connected to a second rotatably mounted pulley 6 via a second metal belt 4. The belts are made from any metal with a high Young's modulus (preferably above $10 \times 10^6$ psi), such as nickle, berylium-copper or stainless steel. In a preferred embodiment, the metal belts are about 0.003" thick. When mounted on the pulleys, the metal belts have a high torsional stiffness, e.g., 193,000 inch-lbs./radian per belt. Second pulley 6 is journaled for rotation with the photoconductive drum axle 17. Preferably, all pulleys have a slightly crowned surface to aid belt tracking.

In a preferred embodiment: 1) pulley 18 and small pulley 5 of double pulley 14 have the same diameter; 2) second pulley 6 and large pulley 2 of double pulley 14 have the same diameter; and 3) large pulley 2 has a diameter which is an integer multiple of small pulley 5. These dimensions allow all pulleys, when the photoconductive drum makes one revolution, to return to their initial positions, thus remaining in phase with one another. The benefit of this is that color registration errors which would be caused by pulley run-out are cancelled out.

Preferably, the diameters of pulleys 5, 2, 18 and 6, are chosen so as to provide a speed reduction of 25:1. This allows the motor M to run at a reasonable speed, for example 250 rpm, while the rotatably mounted photoconductive drum is turning quite slowly, for example 10 rpm.

To provide means for correcting the belt position on pulley 6, mounting plate 9 is mounted for pivotal movement about the Y and Z axes, as shown in FIGS. 2 and 3. Pivotal movement about the Z axis is achieved by a hinge 12 which pivotally connects a flange 9A, connected to one end of mounting plate 9, to a plate 13 extending upwardly from a plate 1A. The mounting plate is adjusted about the Z axis by rotating a screw 7A, mounted to a bracket 7, and a similar screw (not shown) on the backside of plate 9. Both screws are in contact with the mounting plate and by proper rotation will adjust the mounting plate about the Z axis.

Referring to FIG. 3, pivotal movement of mounting plate 9 about the Y axis is afforded by a plate 1B which is secured to plate 1A by four screws 1C. Plate 1A is threaded to receive screws 1C while plate 1B is not threaded. To adjust plate 1B, and therefore mouonting plate 9, about the Y axis, screws 1C are first loosened. A set screw 1D, which threadingly engages plate 1B and butts up against plate 1A, is then rotated so as to adjust plate 1B about the Y axis. Finally, screws 1C are tightened to resecure plate 1B to plate 1A.

To provide tension in belt 4, mounting plate 9 is mounted for pivotal movement about the X axis. Pivotal movement about the X axis is provided by pivotally mounting plate 13 about a pivot pin 10 supported by plate 1A. The line of action of spring 11 is in the same Z-Y plane as the center of belt 4. This eliminates unwanted twisting forces. A compression spring 11, mounted between the printer frame and a bar 9B extending from the mounting plate, acts to urge the mounting plate to rotate counter-clockwise about the x-axis, as viewed in FIG. 2, providing tension in belt 4.

In FIGS. 4-7, the metal belt, speed-raducing system described above is refined by an active tracking system which operates to maintain accurate alignment between the belts and pulleys at all times. Such a system compensates for run-out errors in the pulleys, belt camber and conicity, and thickness variations in the belts. The tracking system basically comprises a pair of photoelectric sensors 40, 42 for detecting lateral movement of each of the belts relative to a nominal position during rotation of the pulleys, and a pair of transducers (tracking motors 48 and 52) for tilting the axes of rotation of the motor driveshaft relative to double pulley 14 and for tilting plate 9 relative to the axis of axle 17. Each of the tracking motors 48 and 52, of course, respond to the respective outputs of the belt-position sensors to maintain belt/pulley alignment. In this embodiment of the invention, bracket 7 and its associated screws are not used (see FIG. 2).

FIG. 4 illustrates the positions of the photoelectric sensors 40 and 42 vis-a-vis belts 4 and 3, respectively. Both of the sensors function in the same manner and thus only the opertion of sensor 42 will be discussed. Sensor 42 operates to emit two light beams $L_1$ and $L_2$, and to detect such light upon being reflected by objects in the beam path. When metal belt 3 is centered on pulley 18 and pulley 2, one light beam strikes metal belt 3 near one edge of the metal belt, and the other light beam strikes the metal belt near its opposite edge. Both light beams reflect off metal belt 3 and return to a pair of photodetectors comprising the sensor. The respective outputs of the photodetectors are fed to a differential amplifier (not shown) which provides an output only in the case of an imbalance of its inputs. Thus, upon detecting that both light beams have returned, and are of sustantially equal intensity, the sensor will not signal a tracking motor (not shown) to make any adjustments. If metal belt 3 strays from its centered position on the pulleys, one of the light beams will not be reflected off the metal belt. Sensor 42 will detect that one of the two light beams has not reflected back, and the differential amplifier will signal a tracking motor to make an adjustment to steer the metal belt back to its centered position.

Turning now to FIG. 5, the steering portion of the active tracking system will be explained. In this embodiment, a motor mounting plate 45 is located between the motor and the mounting plate. Motor M is mounted to motor mounting plate 45 by flexure 44. Flexure 44 may be made of a material such as berylium-copper or spring steel. Drive shaft 18A passes through but does not contact plate 45 or mounting plate 9. Plate 45 is pivotably mounted to the mounting plate by pivot pin 15 such that plate 45 can rotate about the axis of pin 15. A tracking motor 52 is slidably mounted to the mounting plate by pin 62A. When tracking motor 52 receives a signal from photoelectric sensor 42, the tracking motor will rotate its threaded shaft 49. The threaded shaft engages a threaded nut 47 embedded in the mounting plate.

Shaft 49 passes through but does not engage plate 45 and the end of the shaft butts up against motor M. When shaft 49 is rotated in one direction, it will extend further through the mounting plate due to its interaction with the threaded nut embedded in the mounting plate. This will cause the tracking motor and shaft 49 to shift to the right. This motion of shaft 49 causes motor M to rotate counter-clockwise about flexure 44 which tilts drive shaft 18A. This tilting of the driveshaft will move belt 3 to a centered position on pulleys 18 and 2. If shaft 49 is rotated in the opposite direction, the shaft will retract through the mounting plate. A spring 50, which connects plate 45 to motor M, is in tension, causing motor M to rotate clockwise about flexure 44. This will tilt the drive shaft in the opposite direction, also steering metal belt 3 to a centered position.

Referring to FIG. 6, a second tracking motor 48 is mounted to printer frame F by an amount 63. When signaled by sensor 40, motor 48 will rotate its threaded shaft 64. Shaft 64 engages a threaded nut 68. Nut 68 has a pin 62D extending from the nut. Pins 62B and 62C, mounted to mount 63, are on either side of pin 62D, preventing pin 62D and nut 68 from rotating. The end of nut 68 butts up against mounting plate 9. When shaft 64 is rotated by motor 48, it will cause nut 68 to move away from mount 63. This will cause the mounting plate to rotate about the z-axis (see FIG. 2). Rotation of the mounting plate about the z-axis is allowed by hinge 12 (see FIG. 2). When shaft 64 is rotated in the opposite direction by motor M, it will cause nut 68 to move toward mount 63. Spring 66, in tension, connects mount 63 and mounting plate 9. The mounting plate will rotate back about the z-axis under the influence of spring 66. Referring to FIG. 2, the motion of mounting plate 9 about the z-axis will cause pulley 5 to rotate about the z-axis. This motion of pulley 5 will steer belt 4 to a centered position on pulleys 5 and 6.

FIG. 6 is a side view of the FIG. 4 apparatus. This figure is provided to show flexure 44. Flexure 44 connects motor M to plate 45 while allowing the motor to move relative to plate 45.

While this invention has been described in conjunction with various embodiments thereof, it is evident that many alternatives, modifications and variations will be apparent to those skilled in the art. Accordingly, it is intended to cover all such alternatives, modifications and variations that fall within the spirit and broad scope of the appended claims.

What is claimed is:

1. In an image recording system wherein image information is recorded line-by-line on a moving recording element, apparatus for advancing the recording element at a substantially constant speed, said apparatus comprising:
   a) rotatably mounted support means for supporting said recording element;
   b) a motor having a rotatably driven drive shaft;
   c) an endless metal belt comprised of a material having a high Young's modulus;
   d) a first pulley mounted on an axle and a second pulley mounted on said drive shaft, said axle rigidly connecting said support means to said first pulley, said endless metal belt operatively connecting said second pulley and said first pulley to impart rotatable motion of said drive shaft to said support means; and
   e) sensor means for sensing the axial position of said endless metal belt on its associated pulleys and for producing a signal indicative thereof and means responsive to said signal for adjusting the axial position of said endless metal belt on said pulleys.

2. In an image recording system wherein image information is recorded line-by-line on a moving recording element, apparatus for advancing the recording element at a substantially constant speed, said apparatus comprising:
   a) rotatably mounted support means for supporting said recording element;
   b) a motor having a rotatably driven drive shaft;
   c) a pair of endless metal belts, each said belt comprised of a material having a high Young's modulus;
   d) a pulley mounted on an axle, said axle rigidly connecting said support means to said axle-mounted pulley;
   e) a pulley mounted on said drive shaft;
   f) a double pulley comprised of a large pulley and a small pulley rigidly connected together and concentrically arranged, one of said pair of endless metal belts operatively connecting said large pulley and said drive shaft mounted pulley, the other of said pair of endless metal belts operatively connecting said small pulley with said axle-mounted pulley, such that rotatable motion of said drive shaft is imparted to said support means; and
   e) sensor means for sensing the lateral position of at least one of said pair of endless metal belts on its associated pulleys and for producing a signal indicative thereof and means responsive to said signal for adjusting the position of said at least one of said pair of endless metal belts on said pulleys.

* * * * *